United States Patent [19]
Dinkjian et al.

[11] Patent Number: 5,822,576
[45] Date of Patent: Oct. 13, 1998

[54] BRANCH HISTORY TABLE WITH BRANCH PATTERN FIELD

[75] Inventors: Robert M. Dinkjian, Colchester; James R. Robinson, Essex Junction, both of Vt.

[73] Assignee: International Business Machines Corporation, Armonk, N.Y.

[21] Appl. No.: 823,628

[22] Filed: Mar. 26, 1997

[51] Int. Cl.[6] .................................................. G06F 9/42
[52] U.S. Cl. ............................................................. 395/586
[58] Field of Search ........................ 364/DIG. 1 MS File, 364/DIG. 2 MS File; 395/376, 381, 383, 580, 581, 582, 583, 584, 585, 586

[56] References Cited

U.S. PATENT DOCUMENTS

| | | | |
|---|---|---|---|
| 3,559,183 | 1/1971 | Sussenguth | 340/172.5 |
| 4,773,245 | 9/1988 | Lawson et al. | 72/148 |
| 4,894,772 | 1/1990 | Langendorf | 395/587 |
| 5,093,778 | 3/1992 | Favor et al. | 704/2 |
| 5,353,421 | 10/1994 | Emma et al. | 395/200.73 |
| 5,367,703 | 11/1994 | Levitan | 395/800.23 |
| 5,434,985 | 7/1995 | Emma et al. | 395/587 |
| 5,454,117 | 9/1995 | Puziol et al. | 395/800.23 |
| 5,471,597 | 11/1995 | Byers et al. | 711/215 |
| 5,479,627 | 12/1995 | Khalidi et al. | 711/205 |
| 5,511,175 | 4/1996 | Favor et al. | 395/392 |
| 5,515,518 | 5/1996 | Stiles et al. | 395/586 |

*Primary Examiner*—Robert B. Harrell
*Attorney, Agent, or Firm*—Whitham, Curtis & Whitham; Eugene Schkurko, Esq.

[57] ABSTRACT

The detection and selection of the appropriate branch target address in a branch history table in super scalar microprocessor is simplified by reducing the complexity of the branch history table selection logic and providing a structure which is extendible to larger instruction fetch block sizes. This is accomplished by introducing a branch pattern field into the branch history table entry which indicates the presence of other branches (branches not defined by the current entry) within the instruction fetch block.

7 Claims, 3 Drawing Sheets

BRANCH HISTORY TABLE WITH BRANCH PATTERN FIELD

BACKGROUND OF THE INVENTION

1. Field of the Invention

The present invention generally relates to digital processors and, more particularly, to processors with a branch history table and which fetches multiple instructions and/or instructions which have an arbitrary alignment with respect to the memory block being fetched.

2. Background Description

Modern digital processors, such as super scalar microprocessors, decode, dispatch and execute multiple instructions in each machine cycle. In order to optimize the design of such super scalar microprocessors, it is necessary to fetch at least as many instructions from storage as the decode/execute complex is capable of handling in a machine cycle. Since the field of instructions fetched may contain multiple branch instructions, it is desirable to design a branch history table address cache which will predict the location of the next branch instruction which is likely to be taken. In the interests of optimizing the cycle time of the processor, the method chosen to discover the predicted branch (i.e., to determine the target address of that address) and initiate the instruction fetch for that memory block must be relatively simple.

Several branch predictions mechanisms have been proposed and implemented, each having certain advantages and disadvantages. Some of these methods are described in U.S. Pat. No. 5,353,421 to Emma et al. for a multi-prediction branch prediction mechanism. As described therein, by attempting to predict the outcome of a branch instruction, the processor can keep the pipeline full of instructions and, if the outcome of the branch is guessed correctly, avoid pipeline disruption. Emma et al. then go on to provide a brief history of branch prediction mechanisms.

In addition, U.S. Pat. No. 5,367,703 to Levitan describes a technique which predicts the outcome of a branch using different predictors depending upon the distance from the instruction fetch address which is used to fetch the memory block and the location of the branch in the memory block. For each possible distance, a different set of predictor bits which reflect the history of that branch for that distance.

Veh and Patt, in *Proceedings of the Ninth Annual International Symposium on Computer Architecture* 1993, describe a set of predictors which are dependent upon the outcome of one or more prior (in time) branches in addition to the historical outcome of the current branch instruction.

SUMMARY OF THE INVENTION

It is therefore an object of the present invention to simplify the detection and selection of the appropriate branch target address in a branch history table which may indicate multiple branch instructions within an instruction fetch block.

It is another object of this invention to reduce the complexity of the branch history table selection logic and provide a structure which is extendible to larger instruction fetch block sizes.

According to the invention, the foregoing and other objects of the invention are accomplished by introducing a branch pattern field into the branch history table entry which indicates the presence of other branches (branches not defined by the current entry) within the instruction fetch block. A super scalar microprocessor which implements the invention has an improved system for predicting a future branch based on an occurrence of an instruction block fetch. The microprocessor has an instruction fetch mechanism which fetches a block of memory which may contain a multiplicity of branch instructions. The fetch mechanism includes a branch history table having one or more entries, each entry storing branch addresses and target addresses for a branch contained within the instruction fetch block along with the pattern branches within the instruction fetch block. Stored branch and target addresses and branch pattern field from the branch history table are retrieved upon a next occurrence of an instruction block fetch. The branch pattern field is used to ensure that only one of the branch entries will be predicted. An execution unit executes branch instructions, determines their outcome, and the correct target address of said branch instructions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
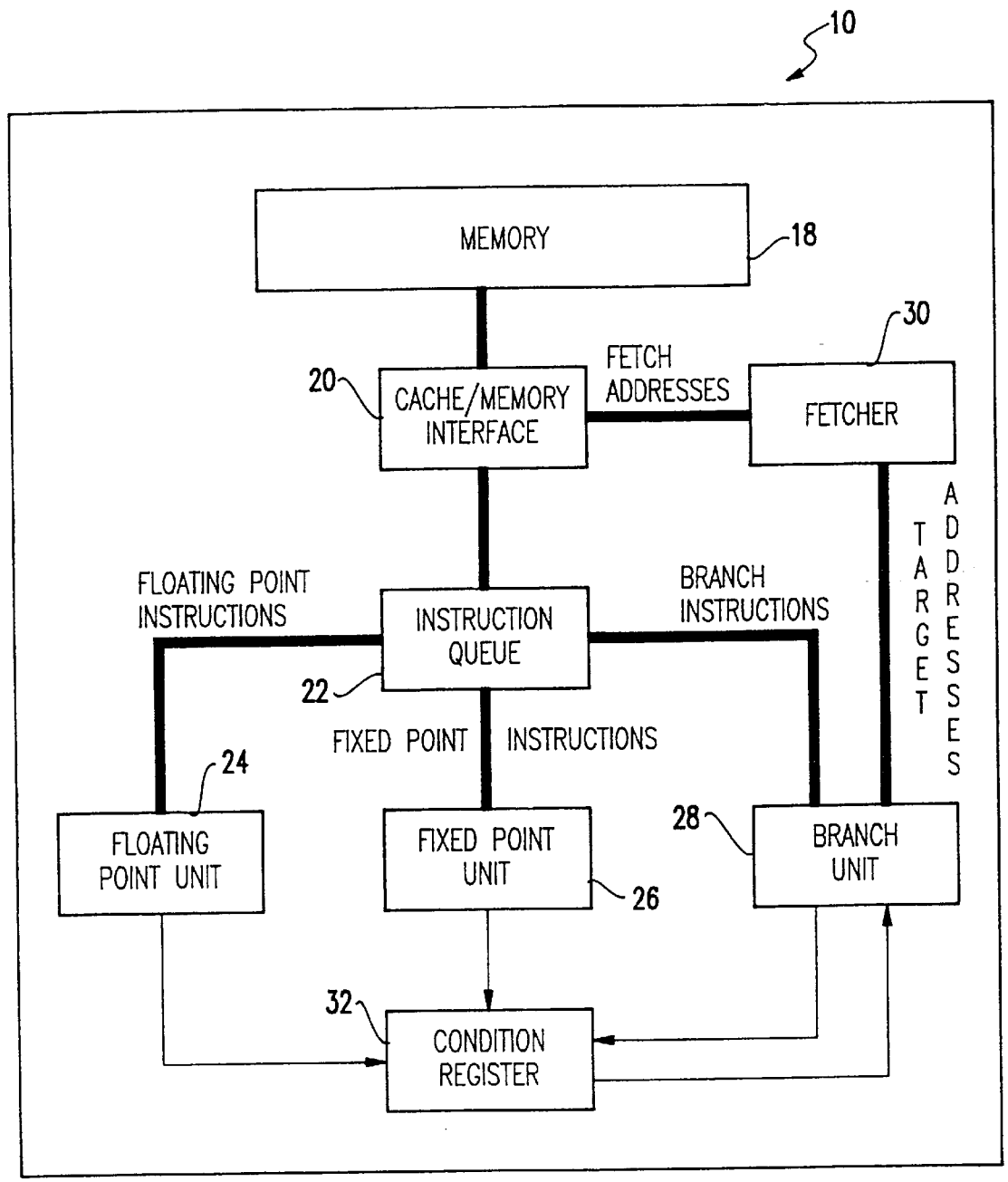
FIG. 1 is a block diagram of a super scalar microprocessor on which the invention is implemented.

There are two distinct branch history table configurations to which this invention applies. The first and most common configuration is a cache, consisting of an n-entry, m-way set associative cache. Table 1 depicts the fields to be found in such a branch history table entry.

TABLE 1

Branch History Table Entry Field Definitions

Branch Address - Commonly called the branch address field, this field does not contain the index bits, those bits used to address the branch history table. Neither does it contain the low order bits which identify the starting position of the branch in the instruction fetch block. Also, high order bits of the address of the branch may be excluded from the branch address field. This field is also called the anti-alias field.
Branch Offset - The branch offset field identifies the starting position of the branch in the instruction fetch block.
Valid - This is the valid entry.
Branch Target Address - The memory location of the next instruction to be executed if the branch instruction is successful (i.e., taken).

The address used to fetch the next block of instructions is divided into four separate fields; the word offset, the index, the anti-alias field, and the discarded bits. The word offset consists of the low-order address bits which indicate position in the memory fetch block where instruction decoding will begin. The index field is $\log_2(n)$ bits which are used to address the branch history table. m entries are read from the cache. If the anti-alias fields are equal, the entry is accepted as designating a branch within the memory block which is being fetched (usually simultaneously with the branch history table interrogation). It is assumed that the branch history table entry contains information which is used to predict the branch outcome. The branch outcome prediction is applied to the m entries which are read from the cache. Since multiple instructions are fetched, there may be multiple predicted taken branches identified within the instruction fetch memory block. Instruction decoding may commence at any position in the instruction fetch block. All predicted taken branches whose word offset is less than the word offset of the instruction fetch address are ignored because those instructions will not be decoded. Since it is the object of the branch history table to provide a single instruction fetch address as the next instruction memory fetch address, when multiple branches are predicted whose word offsets are the same or greater than the word offset where instruction decoding will commence, then the entry with the smaller word offset is selected. The branch target address from the selected entry is used for the nest instruction memory fetch.

One skilled in the art will recognize that the word offset of a branch history table entry must be compared (a>b) with the word offset of the instruction fetch address and with the word offset of all other entries. Consequently, the required number of comparators is $$\frac{(m^2 + m)}{2}.$$

As the number of instructions fetched increases, two effects impact on the branch history table design. First, the number of bits in the word offset field increases. Also it is necessary to increase the number of associativity classes to ensure that multiple branches within an instruction fetch block are all recognized. The combination of these effects causes a geometric increase in the circuitry required to select the correct branch history table entry.

To reduce the complexity of the branch history table selection logic, and provide a structure which is extendible to larger instruction fetch block sizes, each entry in the branch history table has a branch pattern field added to the entry. The branch pattern field has a binary bit for each position in the instruction fetch block where instruction decoding may commence except for the rightmost such position. At the time a branch history table entry is updated, the pattern of predicted taken branches in the instruction fetch block is combined with the word offset of the particular branch history table entry to provide a field with a bit set corresponding to any predicted taken branch in the instruction fetch block which is at a lower address than the branch instruction being indicated by the current entry. In the preferred embodiment of the invention, word offset comparators are removed from the implementation and replaced by a simple 2-AND j-AND 3-AND logic structure, where j is one more than the number of bits in the branch pattern field.

This invention also may be usefully applied to a branch history table which is embodied as a content addressable memory (CAM). This embodiment may be thought of as a degenerate case of the more common set associative memory cache design where the index field has zero bits, and each entry in the branch history table has its own anti-alias field comparator and hit detection logic. The branch pattern field solves a significant problem which arises with regard to the use of content addressable memories in computing systems which fetch multiple instructions each cycle.

In the most common implementation of a branch history table, the branch offset is not considered when a fetch address is used to search a branch history table for predicted branch instructions. The number of distinct branches which may be predicted within the instruction fetch block is determined by m, the number of entries which are examined for a hit. As long as m is small, it is practical to select the branch instruction nearest to the fetch address as the branch to predict. However, as m becomes large, as in the case of a fully associative content addressable memory, without this invention it is impractical to permit multiple anti-alias field matches. Consequently, it is generally impossible to predict within such a branch history table more than one branch per instruction fetch block. One solution to this deficiency which is implemented by the PowerPC™ 604e microprocessor is to include bits from the branch offset field in the anti-alias field comparison. This approach allows the recognition of multiple branches within an instruction fetch block. However, a disadvantage of this approach is that a single branch may require multiple branch history table entries. In fact if j bits from the branch offset field are included in the anti-alias field comparison, then up to 2 entries in the branch history table may be assigned to predict a single branch instruction. The application of the branch pattern field to a content addressable memory permits the prediction of multiple branches within an instruction fetch block with but a single entry per branch instruction.

Referring now to the drawings, and more particularly to FIG. 1, there is shown a high level block diagram of a super scalar microprocessor system 10 which may be utilized to implement the method and system of the present invention. As illustrated, the microprocessor system 10 includes a memory 18 which stores data, instructions and the like. Data or instructions stored in memory 18 are accessed utilizing cache/memory interface 20 in a method well known to those skilled in the art. The sizing and utilization of cache memory systems is also well understood in the data processing arts and not addressed within the present invention. However, those skilled in the art will appreciate that by utilizing modern associative cache techniques, a large percentage of memory accesses may be achieved utilizing data temporarily stored within cache/memory interface 20.

Instructions from cache/memory interface 20 are typically loaded into instruction queue 22 which preferably includes a plurality of queue positions. In a typical embodiment of a super scalar microprocessor system, the instruction queue may include eight queue positions and thus, in a given cycle, between zero and eight instructions may be loaded into instruction queue 22, depending upon how many valid instructions are passed by cache/memory interface 20 and how much space is available within instruction queue 22.

As is typical in such super scalar microprocessor systems, instruction queue 22 is utilized to dispatch instructions to multiple execution units. As depicted in FIG. 1, microprocessor system 10 includes a floating point processor unit 24, one or more fixed point or integer processor units 26, and a branch processor unit 28. Thus, instruction queue 22 may dispatch between zero and three (or more, depending on the number of fixed point processor units and/or other execution units of the particular microprocessor) instructions during a single cycle, one to each execution unit.

In addition to sequential instructions dispatched from instruction queue 22, so called "conditional branch instructions" may be loaded into instruction queue 22 for execution by the branch processor unit 28. A conditional branch instruction is an instruction which specifies an associated conditional branch to be taken within the application in response to a selected outcome of processing one or more sequential instructions. In an effort to minimize run-time delay in a pipelined processor system, such as microprocessor system 10, the presence of a conditional branch instruction within the instruction queue is predicted when a block of instructions is fetched to instruction queue 22 by the branch history table which is a part of a fetch mechanism, referred to as fetcher 30. This branch history table will be described in more detail below. As should be apparent to those skilled in the art when a conditional branch is predicted as "not taken", the sequential instructions within the instruction queue simply continue along a current path and no instructions are altered. However, if the prediction as to the occurrence of the branch is incorrect, the instruction queue must be purged of sequential instructions which follow the conditional branch instruction program order and target instructions must be fetched. Alternately, if the conditional branch is predicted as "taken", then the target instructions are fetched and utilized to follow the conditional branch, if the prediction is resolved as correct. And of course, if the prediction of "taken" is incorrect, the target instructions must be purged and the sequential instructions which follow the conditional branch instruction in program order must be retrieved.

As illustrated, microprocessor system 10 also includes a condition register 32. Condition register 32 is utilized to temporarily store the results of various comparisons which may occur as a result of the outcome of sequential instructions which are processed within microprocessor system 10. Thus, floating point processor unit 24, fixed point processor unit 26 and branch processor unit 28 are all coupled to condition register 32. The status of a particular condition within condition register 32 may be detected and coupled to branch processor unit 28 in order to generate target addresses, which are then coupled to fetcher 30.

Figure 2:
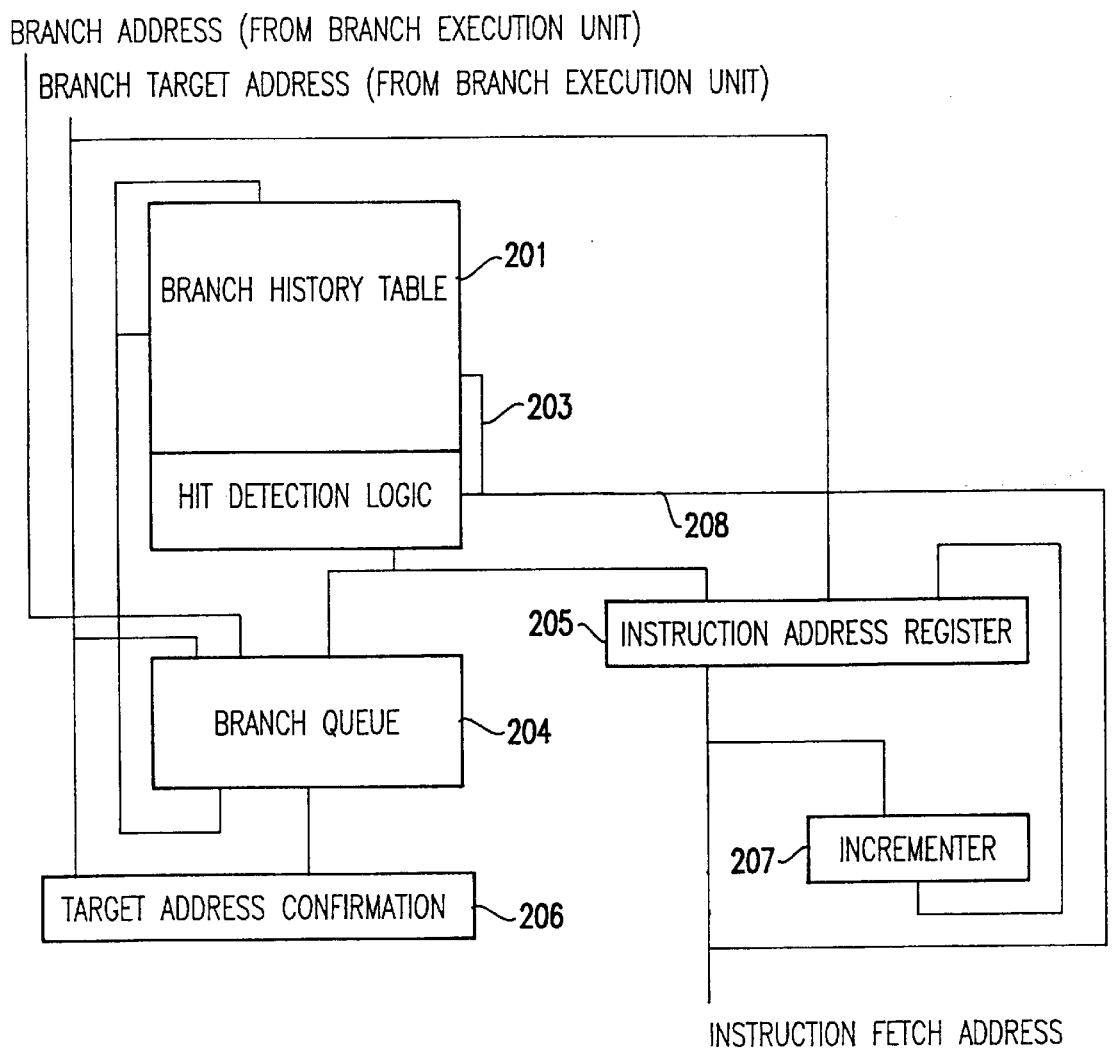
FIG. 2 is a block diagram showing in more detail the branch history table.

FIG. 2 shows in more detail the fetcher 30. The target address is compared with the predicted target address from branch queue 204 in the target address confirmation logic 206. If the branch target was correctly predicted, no action is required. However, if the branch was not predicted, or the branch target address is incorrect, the following instructions must be purged and the correct target instructions must be fetched. Also, the branch history table 201 must be updated with the branch address, the correct target address, and the branch pattern.

When a branch target address is presented to the fetcher 30, and the target address confirmation fails, the branch target address is loaded into the instruction address register 205, and the branch target address and the branch address are loaded into the branch queue 204. The contents of the instruction address register 205 is coupled to the cache/ memory interface 20. The contents of the branch queue 204 is coupled to the branch history table 201. Using any of several least recently used (LRU) algorithms known in the art, one of the m entries is selected to be replaced. Each of the remaining entries are interrogated to determine if the anti-alias field of that entry matches the anti-alias field from the branch address.

Figure 3:
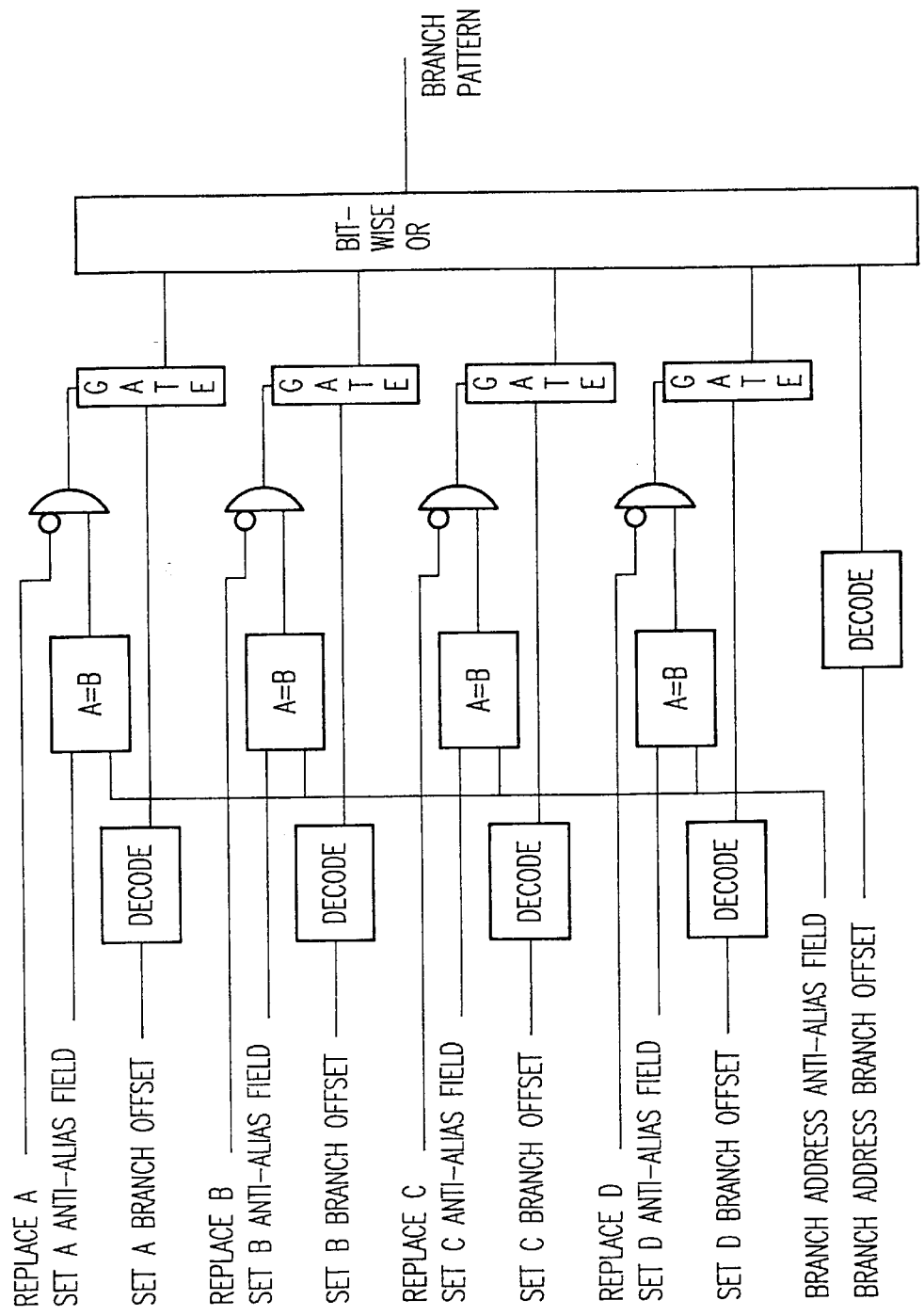
FIG. 3 is a block and logic diagram showing in more detail the branch pattern generator for branch history table updates.

As shown in FIG. 3, the branch offset field for each matching entry, as well as the branch offset field from branch queue 204, are encoded into a one-of-many code. These codes are combined by ORing them together as shown in FIG. 3 to provide the pattern of predicted branches in the instruction fetch block which would be fetched by the branch address. FIG. 3 depicts the design for a four way set associative branch history table. One skilled in the art may readily extend this design to any number of "ways" and instruction fetch block sizes. This branch pattern will contain a "1" corresponding to each position in the instruction fetch block which contains a predicted taken branch.

In certain implementations, there may be a branch instruction which would be predicted taken except for the case that the LRU algorithm used has caused the branch at that branch offset to be overlaid by a different branch. Recalling that in the preferred implementation, for the purposes of updating the branch history table 201, a set of m entries have been updated, and the anti-alias fields of those entries have been compared to the anti-alias field of the branch address. For the subset of the m entries whose anti-alias fields matched, the branch pattern field in those entries must be updated to reflect the branch position of the branch which is being added to the branch history table 201. In the preferred implementation, the branch pattern is combined with the branch offset of the branch history table entries whose branch pattern entries are being updated. The new branch pattern, which we will call the entry specific branch pattern, is generated by setting each bit in the entry specific branch pattern for which the corresponding branch pattern bit is set, and the branch pattern represents a branch address which is less than the branch address represented by the branch offset. The purpose of this encoding scheme is to simplify the logic which selects the "winning" branch history table entry in the hit detection logic. Table 2 shows an example of the generation of the entry specific branch pattern for a microprocessor with an instruction fetch block which contains four possible branch offsets. That is to say, four positions in the instruction fetch block which may contain instructions.

TABLE 2

| Encoding for Entry Specific Branch Pattern field | | |
|---|---|---|
| Branch Offset | Branch Pattern | Entry Specific Branch Pattern |
| 00 | ???? | 0000 |
| 01 | 0??? | 0000 |
| 01 | 1??? | 1000 |
| 10 | 00?? | 0000 |
| 10 | 01?? | 0100 |
| 10 | 10?? | 1000 |
| 10 | 11?? | 1100 |
| 11 | 000? | 0000 |
| 11 | 001? | 0010 |
| 11 | 010? | 1010 |
| 11 | 011? | 0110 |
| 11 | 100? | 1000 |
| 11 | 101? | 1010 |
| 11 | 110? | 1100 |
| 11 | 111? | 1110 |

In Table 2, it will be noted that the rightmost bit is always zero and need not be stored in the branch history table.

Whenever an instruction fetch block address is coupled to the cache/memory interface 20 with the purpose of initiating an instruction block fetch, the instruction fetch block address is also coupled to the branch history table 201 on bus 208. The instruction fetch address is partitioned into the anti-alias field, the index field, and the fetch offset. The index field is used to select a set of m branch history table entries. The anti-alias field from the instruction fetch address is compared with the anti-alias fields from the m branch history table entries. All branch history table entries in set m which have an anti-alias field equal to the instruction fetch address anti-alias field form a set m'; the set m' may be empty, contain a single entry, or contain multiple entries. If the set m' is empty, there is no branch prediction for this instruction block. If the set m' contains a single entry, that entry is used to predict a branch. In the case that there are multiple entries in set m', the instruction fetch offset is encoded into a field with a bit set corresponding to each bit in the branch pattern which represents an instruction position coincident with, or at a higher offset than the fetch offset. Table three shows an example of the generation of the fetch offset recoding for a microprocessor with an instruction fetch block which contains four possible branch offsets.

TABLE 3

Instruction Fetch Address Recoding

| Fetch Offset | Recoded Value |
|---|---|
| 00 | 1111 |
| 01 | 0111 |
| 10 | 0011 |
| 11 | 0001 |

Since each branch history table entry has its entry specific branch pattern field, the determination, that an entry is the correct entry to use for branch prediction is done as follows. The following conditions must be met for an entry to be the correct entry:

The branch offset must be coincident, or to the right of the instruction fetch address.

There must be no other branches in the instruction fetch block which are between the instruction fetch address and the branch offset.

In the preferred implementation, the branch offset is represented in the branch history table entry as a decoded value. That is, there is a stored bit corresponding to each position in the instruction fetch block which may contain a branch instruction. Only one bit in the entry may be set, indicating the position of the branch which the current entry is representing. For the purposes of this discussion, we will designate this entry as offset. The branch history table entry branch pattern is designated pattern. The recoded instruction fetch address is designated fetch. fetch with the rightmost bit truncated is designated fetch!. The equation for entry hit is:

entry hit <= {(fetch AND offset) ≠ 0} AND
{(fetch! AND pattern) = 0}

An advantage of this invention is that the determination of which entry is valid for a fetch request is done in parallel with the anti-alias comparison. When entry hit and anti-alias match are both true for an entry, the target address field of the branch history table entry is coupled to instruction address register 205. If either entry hit or anti-alias match for all m selected branch history table entries are false, then there is no branch prediction for the instruction block fetched, and the output of incrementer 207 is coupled to instruction address register 208. The next sequential instruction block is fetched next. When a target address is coupled to the instruction register 205, the target address and branch address are also coupled to the branch queue 204 where it is held until the predicted branch executes. Many of the details of the operation of the fetcher have been omitted from this description because those details are unaffected by the addition of the branch pattern field and the consequent modifications to the branch history table update and branch hit detection. One skilled in the art and knowledgeable of prior art would be able to supply the missing detail for a specific application.

While the invention has been described in terms of a single preferred embodiment implemented in a super scalar microprocessor, those skilled in the art will recognize that the invention can be practiced with modification within the spirit and scope of the appended claims. For example, the invention is applicable to any computing device which contains a branch history table and fetches more than a single instruction, including main frames and digital signal processors.

Having thus described our invention, what we claim as new and desire to secure by Letters Patent is as follows:

1. A digital processor having an improved system for predicting a future branch based on an occurrence of an instruction block fetch comprising:

an instruction fetch mechanism which fetches a block of memory which may contain a multiplicity of branch instructions;

a branch history table having one or more entries, each entry storing branch addresses and branch target addresses for a branch contained within the instruction fetch block and a branch pattern field of branches within said instruction fetch block;

retrieving means for retrieving said stored branch and target addresses and branch pattern field from said branch history table upon a next occurrence of an instruction block fetch;

selection means employing the branch pattern field to ensure that only one of the branch entries will be predicted; and an execution unit which executes branch instructions, determines their outcome, and the correct target address of said branch instructions.

2. The digital processor of claim 1 further comprising update means for updating said branch history table based on a branch instruction outcome.

3. The digital processor of claim 2 wherein an entry in the branch history table further includes an anti-alias field, an index field and a fetch offset, the index field being used to select a set of m branch history table entries, the anti-alias field from an instruction fetch address being compared with anti-alias fields from the m branch history table entries, all branch history table entries which have an anti-alias field equal to the instruction fetch address anti-alias field forming a set m', the set m' if empty indicating no branch prediction for an instruction block, but if the set m' contains a single entry, that entry being used to predict a branch.

4. The digital processor recited in claim 3 wherein if the set m' contains multiple entries, the instruction fetch offset is encoded into a field with a bit set corresponding to each bit in the branch pattern which represents an instruction position coincident with, or at a higher offset than the fetch offset.

5. The digital processor recited in claim 4 wherein the branch pattern stored in a branch history table entry is an entry specific branch pattern which is encoded by setting each bit for which a corresponding bit is set in the branch pattern, and a position of the bit represents a branch address which is less than the branch address represented by the branch offset of a branch represented by that entry.

6. The digital processor of claim 5 wherein the digital processor is a super scalar microprocessor.

7. The digital processor recited in claim 2 wherein the update means implements a least recently used (LRU) algorithm to update a branch target address.

* * * * *